United States Patent
Kizumoto et al.

(10) Patent No.: US 10,696,876 B2
(45) Date of Patent: Jun. 30, 2020

(54) SELF-EMULSIFICATION TYPE EMULSION CONTAINING MODIFIED POLYPROPYLENE RESIN

(71) Applicant: TOYOBO CO., LTD., Osaka (JP)

(72) Inventors: Hirotoshi Kizumoto, Hyogo (JP); Masashi Nakashima, Hyogo (JP)

(73) Assignee: TOYOBO CO., LTD., Osaka (JP)

( * ) Notice: Subject to any disclaimer, the term of this patent is extended or adjusted under 35 U.S.C. 154(b) by 0 days.

(21) Appl. No.: 15/509,917

(22) PCT Filed: Sep. 7, 2015

(86) PCT No.: PCT/JP2015/075299
§ 371 (c)(1),
(2) Date: Mar. 9, 2017

(87) PCT Pub. No.: WO2016/043076
PCT Pub. Date: Mar. 24, 2016

(65) Prior Publication Data
US 2017/0253775 A1 Sep. 7, 2017

(30) Foreign Application Priority Data
Sep. 17, 2014 (JP) ................................ 2014-188609

(51) Int. Cl.
| | |
|---|---|
| *C09J 123/26* | (2006.01) |
| *C08L 23/26* | (2006.01) |
| *C09J 123/10* | (2006.01) |
| *C08L 51/06* | (2006.01) |
| *C08F 8/44* | (2006.01) |
| *C09J 151/06* | (2006.01) |
| *C08J 3/215* | (2006.01) |
| *C08J 3/03* | (2006.01) |
| *C08J 3/05* | (2006.01) |

(52) U.S. Cl.
CPC ............... *C09J 123/26* (2013.01); *C08F 8/44* (2013.01); *C08J 3/03* (2013.01); *C08J 3/05* (2013.01); *C08J 3/215* (2013.01); *C08L 23/26* (2013.01); *C08L 51/06* (2013.01); *C09J 123/10* (2013.01); *C09J 151/06* (2013.01); *C08J 2323/26* (2013.01); *C08J 2351/06* (2013.01)

(58) Field of Classification Search
CPC ...... C09J 123/26; C09J 123/10; C09J 151/06; C08L 51/06; C08L 23/26; C08F 8/44; C08J 3/215; C08J 3/03; C08J 3/05; C08J 2351/06; C08J 2323/26
See application file for complete search history.

(56) References Cited

U.S. PATENT DOCUMENTS

| | | |
|---|---|---|
| 2008/0032055 A1 | 2/2008 | Ogawa et al. |
| 2009/0041943 A1 | 2/2009 | Ogawa et al. |
| 2009/0130322 A1 | 5/2009 | Nagano et al. |
| 2009/0162679 A1 | 6/2009 | Asami et al. |
| 2014/0137435 A1* | 5/2014 | Yano ............... A43B 1/10 36/83 |

FOREIGN PATENT DOCUMENTS

| | | |
|---|---|---|
| CN | 101117479 | 2/2008 |
| CN | 101292002 | 10/2008 |
| CN | 101351513 | 1/2009 |
| CN | 101362132 | 2/2009 |
| JP | 2001-152119 | 6/2001 |
| JP | 2002-146315 | 5/2002 |
| JP | 2005-220153 | 8/2005 |
| JP | 2007-127202 | 5/2007 |
| JP | 2007-269827 | 10/2007 |
| JP | 2009-79078 | 4/2009 |
| JP | 2009-173756 | 8/2009 |
| JP | 2009-235289 | 10/2009 |
| JP | 2009235289 | * 10/2009 |
| JP | 2012-197388 | 10/2012 |
| JP | 2013-095873 | 5/2013 |
| JP | 2015-151402 | 8/2015 |
| WO | 2013/066960 | 5/2013 |

OTHER PUBLICATIONS

Translation of JP 2009-235289 (2009) (Year: 2009).*
International Search Report dated Nov. 24, 2015 in International (PCT) Application No. PCT/JP2015/075299.
Journal of the Japan Society of Colour Material, vol. 87, No. 4, 2014, pp. 139-144.
Extended European Search Report dated Jul. 18, 2018 in European Application No. 15841986.1.
Office Action dated Feb. 2, 2019 in corresponding Chinese Patent Application No. 201580050515.5 with Machine translation.

* cited by examiner

*Primary Examiner* — Robert C Boyle
(74) *Attorney, Agent, or Firm* — Wenderoth, Lind & Ponack, L.L.P.

(57) ABSTRACT

The present invention provides a self-emulsification type emulsion exhibiting excellent adhesion to olefin-based base materials such as polyethylene and polypropylene without using an emulsifier. The self-emulsification type emulsion of the present invention comprises a tackifier and a modified polypropylene resin having an anionic functional group, and satisfies (1) and (2) given below:
(1) the modified polypropylene resin having an anionic functional group is dispersed in water in the absence of an emulsifier, and
(2) a dispersion particle comprising the modified polypropylene resin having an anionic functional group surrounds the tackifier.

7 Claims, No Drawings

SELF-EMULSIFICATION TYPE EMULSION CONTAINING MODIFIED POLYPROPYLENE RESIN

TECHNICAL FIELD

The present invention relates to a self-emulsification type emulsion that exhibits excellent adhesion to an olefin-based resin base material such as polyethylene and polypropylene.

BACKGROUND ART

A method for adhering a base material that has low surface energy, such as polyethylene and polypropylene, has been studied, and designing an adhesive that has excellent adhesion to such a material has been known to be difficult. As a method for providing excellent adhesion to such a base material with low surface energy, one suggestion has been a technique in which the surface of a body to be adhered to is pre-treated with corona discharge, plasma treatment, etc., to increase the surface energy, followed by adhesion. While such a method is an effective technique, expensive equipment is required and power consumption increases.

Recently, products using olefin-based materials such as polyethylene and polypropylene are increasing in various applications such as for household articles around us and for industrial applications. In particular, in applications for vehicles, application of a molding material containing polypropylene as a material has been actively promoted in the trend toward automobile weight reduction. From such circumstances, effective adhesives that had been previously unavailable have been recently developed. This is also disclosed in Non-patent Literature 1 on page 139 under "2.1 State of Adhesion Techniques." Specific examples of the adhesive include those disclosed in Patent Literature 1 and 2. In addition, due to problems in the work environment, adhesives have been recently changing from conventional organic solvent adhesives to aqueous adhesives, which are more environmentally friendly. The examples are disclosed, for example, in Patent Literatures 3 to 5.

CITATION LIST

Patent Literature

PTL 1: JP2012-197388A
PTL 2: JP2013-95873A
PTL 3: JP2005-220153A
PTL 4: JP2001-152119A
PTL 5: JP2002-146315A

Non-Patent Literature

NPL 1: J. JPN. SOC. COLOUR MAJ. JPN. SOC. COLOUR MATER., 87[4], 139-144 (2014)

SUMMARY OF INVENTION

Technical Problem

Emulsions in which a polymer is dispersed in water generally include forcibly emulsified emulsions, which also use a surfactant (emulsifier), and self-emulsification type emulsions, in which a hydrophilic polar group is introduced into a polymer chain to provide the polymer itself with an emulsifying function. An emulsifier is very useful for stably dispersing in water a polymer that does not have a self-emulsifying function; however, when used as an aqueous adhesive, the emulsifier remains in an adhesive layer applied and dried on an object substance, which adversely affects adhesion. This is also disclosed in the prior art section of Patent Literature 5. Patent Literature 3 teaches in paragraph [0116] and the Examples that a polyolefin resin composition, which is the main component, is formed into an aqueous composition by a surfactant (emulsifier). Patent Literature 4 also teaches in the Description of Embodiments that an acryl-based resin, which is the main adhesive component, is subjected to emulsion polymerization in the presence of an emulsifier. Patent Literature 5 discloses in paragraphs [0017] and [0019] in the Description of Embodiments that a polyurethane resin to be incorporated is an anionic self-emulsified urethane resin, and a tackifier, which is incorporated together with the polyurethane resin, is dispersed in water by an emulsifier. Paragraphs [0024] to [0029] in the Description of Embodiments also teach that the acryl-based resin, which is the main component, is preferably subjected to emulsion polymerization in the presence of a surfactant; however, the acryl-based resin can be also subjected to emulsion polymerization in the presence of the polyurethane resin that is self-emulsified in water and the tackifier that is dispersed in water by the emulsifier.

An object of the present invention is to provide a self-emulsification type emulsion of an aqueous adhesive exhibiting excellent adhesiveness to olefin-based resin base materials such as polyethylene and polypropylene, the self-emulsification type emulsion being easily prepared without using an emulsifier.

Solution to Problem

To attain the above object, the inventors conducted extensive research to suggest the following invention.

Specifically, the present invention relates to a self-emulsification type emulsion comprising a tackifier and a modified polypropylene resin having an anionic functional group, and satisfying (1) and (2) given below:

(1) the modified polypropylene resin having an anionic functional group is dispersed in water in the absence of an emulsifier, and (2) a dispersion particle comprising the modified polypropylene resin having an anionic functional group includes the tackifier.

The tackifier is preferably contained in the range of 5 parts by weight or more to 80 parts by weight or less per 100 parts by weight of the modified polypropylene resin.

The modified polypropylene resin dispersion particle preferably has a Z mean particle diameter of 500 nm or less.

An adhesive composition or an adhesive for a polyolefin-based resin comprising the self-emulsification type emulsion according to any one of the above.

Advantageous Effects of Invention

The self-emulsification type emulsion of the present invention has excellent storage stability because the modified polypropylene resin having an anionic functional group is uniformly and stably dispersed in water in the form of fine particles and in the state including a tackifier. Further, since the present invention does not substantially use an emulsifier, a coating film produced using the emulsion does not suffer from, for example, unevenness, and ensures excellent water resistance and adhesiveness to polyolefin-based resins such as polypropylene and polyethylene.

DESCRIPTION OF EMBODIMENTS

The embodiments of the present invention are detailed below.

Modified Polypropylene Resin Having an Anionic Functional Group

The modified polypropylene resin having an anionic functional group (hereinbelow sometimes simply referred to as "modified polypropylene resin") can be obtained by graft copolymerization of at least one member selected from the group consisting of polypropylenes and propylene-α-olefin copolymers with a compound having an anionic functional group. As the anionic functional group, a carboxyl group is preferable. The compound having an anionic functional group is not particularly limited; however, it is preferable to use at least one member selected from the group consisting of α,β-unsaturated carboxylic acids and acid anhydrides thereof. The propylene-α-olefin copolymer is obtained by copolymerizing propylene, which is used as the main component, and α-olefin. Examples of the α-olefin include ethylene, 1-butene, 1-heptene, 1-octene, 4-methyl-1-pentene, and the like. The α-olefin can be used singly or in combination. Of these, 1-butene is preferable. Although the ratio of the propylene component and the α-olefin component in the propylene-α-olefin copolymer is not particularly limited, the propylene component is preferably 50 mol % or more.

The method for producing a propylene-α-olefin copolymer is not particularly limited; however, a propylene-α-olefin copolymer polymerized using a metallocene catalyst is preferable because it has uniform crystallinity and excellent solubility in solvents.

At least one member of α,β-unsaturated carboxylic acids and acid anhydrides thereof is not particularly limited. Examples include maleic acid, itaconic acid, citraconic acid, and acid anhydrides thereof. Of these, acid anhydrides are preferable, maleic anhydrides and itaconic anhydrides are more preferable, and maleic anhydrides are even more preferable. Specific examples of the acid-modified polyolefin include maleic-anhydride-modified polypropylene, maleic-anhydride-modified-propylene-ethylene copolymers, maleic-anhydride-modified propylene-butene copolymers, maleic-anhydride-modified propylene-ethylene-butene copolymers, and the like. These acid modified polyolefins can be used singly or in combination of two or more. The amount for graft copolymerization is preferably 0.1 to 10 wt %, and more preferably 1 to 5 wt %. An amount too low decreases compatibility with a tackifier, which may lose adhesion. An amount too high may decrease the stability of the emulsion.

A known method, such as a solution method or a melting method, can be used as a method for graft copolymerizing at least one member selected from the group consisting of polypropylenes and propylene-α-olefin copolymers with at least one member selected from the group consisting of α,β-unsaturated carboxylic acids and acid anhydrides thereof.

The solution method is performed, for example, in the following manner. Specifically, at least one member selected from the group consisting of polypropylenes and propylene-α-olefin copolymers is dissolved in an aromatic organic solvent such as toluene at 100 to 180° C., then at least one member selected from the group consisting of α,β-unsaturated carboxylic acids and acid anhydrides thereof is added thereto, and then, a radical generator is added all at once or in steps for the reaction.

The melting method is performed, for example, in the following manner. Specifically, at least one member selected from the group consisting of polypropylenes and propylene-α-olefin copolymers is melted by heating to a melting point or more, and then a radical generator and at least one member selected from the group consisting of α,β-unsaturated carboxylic acids and acid anhydrides thereof is added thereto for the reaction.

Examples of the radical generating agent include benzoyl peroxide, dicumyl peroxide, di-t-butyl peroxide, and the like, which can be selected based on the reaction temperature and decomposition temperature.

The weight average molecular weight of the modified polypropylene resin having an anionic functional group is preferably 5000 to 200000. When the weight average molecular weight is less than 5000, the cohesion is weakened, which may reduce adhesiveness. When the weight average molecular weight exceeds 200000, the solubility decreases, which may make dispersion in water impossible. The weight average molecular weight of the resin is more preferably 30000 to 120000.

Tackifier

The tackifier used in the present invention must have high compatibility with the modified polypropylene resin having an anionic functional group. When the compatibility is poor, the modified polypropylene resin cannot surround the tackifier, which may fail to form a stable emulsion. The SP of the tackifier is a rough guide for determining compatibility. The SP of the tackifier showing excellent compatibility with the modified polypropylene resin is preferably 8.6 to 8.8 $(J/cm^3)^{1/2}$ according to the Hoy calculation formula. It is known that the SP (δ) of a polymer such as a tackifier according to the Hoy calculation formula can be obtained as follows.

$$\delta \text{ (polymer)} = \rho \Sigma E/M$$

wherein ρ is the density of the polymer, M is the molecular weight of a repeating structural unit of the polymer, and E is an index of molar cohesive energy of each structural unit forming the polymer. Numerical values of E given in various documents can be used. For example, the document J. Paint Technology vol. 42 76-118 (1970) discloses such a numerical value.

Regarding a method for actually confirming compatibility, the higher the transparency of a dried coating film produced by mixing the modified polypropylene resin and the tackifier, the higher the compatibility is considered to be. Although the transparency can be confirmed visually, a HAZE meter, (1.0 or less is preferable, and 0.5 or less is more preferable), for example, can be used for more accurate determination. Alternatively, the dynamic viscoelasticity property of the dried film produced above is measured, and when the primary dispersion peak of loss modulus (E") is not broader than that before addition of the tackifier, the compatibility is considered excellent.

The softening point of the tackifier is preferably 60° C. or more, more preferably 70° C. or more, and even more preferably 80° C. or more; and preferably 160° C. or less, and more preferably 150° C. or less. The number average molecular weight of the tackifier is preferably 500 or more, more preferably 700 or more, and even more preferably 800 or more; and preferably 1800 or less, more preferably 1600 or less, and even more preferably 1500° C. or less. When the number average molecular weight of the tackifier is less than 500, the properties of the modified polypropylene resin coating film may decrease, or bleed-out may occur on the surface of the coating film. When the number average molecular weight of the tackifier exceeds 1800, the compatibility with the modified polypropylene resin may become poor.

The tackifier used in the present invention is not particularly limited; however, it is preferably selected from terpene-based resins, rosin-based resins, and oil-based resins. Of these, terpene-based resins are more preferable. Of the terpene-based resins, aromatic modified terpene resins are particularly preferable. Examples of commercially available products include YS resin series produced by Yasuhara Chemical Co., Ltd. (YS resin TO125, YS resin TO115, YS resin TO105, YS resin TO85, YS resin TR105, and YS resin LP, each having an SP of 8.73 $(J/cm^3)^{1/2}$; and YS Polyster T130 having an SP of 8.81 $J/cm^3)^{1/2}$).

The amount of the tackifier is preferably 5 parts by weight or more to 80 parts by weight or less, more preferably 10 parts by weight or more to 70 parts by weight or less, even more preferably 15 parts by weight or more to 65 parts by weight or less, and most preferably 20 parts by weight or more to 60 parts by weight or less per 100 parts by weight of the modified propylene resin. When the amount of the tackifier is less than 5 parts by weight, the effect of incorporating the tackifier may not be obtained. When the amount of the tackifier exceeds 80 parts by weight, the surrounded emulsion may have a Z mean particle diameter of over 500 nm, which may fail to form a stable emulsion.

Self-Emulsification Type Emulsion

The self-emulsification type emulsion of the present invention contains a modified polypropylene resin having an anionic functional group and a tackifier, wherein (1) the modified polypropylene resin having an anionic functional group is dispersed in water in the absence of an emulsifier, and (2) a dispersion particle comprising the modified polypropylene resin having an anionic functional group surrounds the tackifier.

Since the dispersion particle comprising the modified polypropylene resin surrounds a tackifier and is uniformly and stably dispersed in water in the state of fine particles, storage stability is excellent, and further, adhesiveness to polyolefin-based resin materials such as polypropylene and polyethylene and water resistance are excellent.

In the self-emulsification type emulsion of the present invention, the state in which the tackifier is surrounded in the modified polypropylene resin is as follows. The tackifier is included inside the modified polypropylene resin in the form of dispersion particles (micell particles) in which the propylene chain part (hydrophobic part) of the modified polypropylene resin is inside, and the part having an anionic functional group (hydrophilic part) is outside. Further, the hydrophilic part of the modified polypropylene resin is considered to be neutralized by a basic substance. This can be presumed from the fact that the tackifier, which is phase-separated and precipitated in water because it alone cannot be stably dispersed or dissolved in water, is not phase-separated and precipitated when contained in the self-emulsification type emulsion of the present invention, and the emulsion is present in a uniform and stable state. This can be also presumed from the fact that the particle diameter of the dispersion particle increases to a certain extent as the amount of the tackifier increases.

In the self-emulsification type emulsion of the present invention, the tackifier is surrounded in the dispersion particle of the modified polypropylene resin; accordingly, special equipment such as an extrusion machine or an emulsion machine for emulsifying and dispersing the tackifier is not necessary, and moreover, the emulsion can be emulsified in the absence of an emulsifier. In the present invention, "in the absence of an emulsifier" means that the emulsifier is preferably contained in an amount of 0.1 parts by weight or less, more preferably 0.01 parts by weight or less, and even more preferably 0 parts by weight per 100 parts by weight of the modified polypropylene resin. Because of the absence of the emulsifier, the coating film produced using the emulsion of the present invention does not have, for example, unevenness, and attains excellent water resistance and adhesiveness to polyolefin-based resin base materials such as polypropylene and polyethylene.

The Z mean particle diameter of the self-emulsification type emulsion is not particularly limited; however, it is preferably 500 nm or less, more preferably 450 nm or less, and even more preferably 400 nm or less. When the Z mean particle diameter exceeds 500 nm, a stable emulsion may not be formed. The lower limit of the Z mean particle diameter is not particularly limited; however, it is generally 50 nm or more.

An example of the method for preparing the self-emulsification type emulsion of the present invention is detailed below, but the method is not limited to this example. Specifically, first, the modified polypropylene resin having an anionic functional group and the tackifier are dissolved by heating at a predetermined ratio in an ether-based solvent, alcohol-based solvent, aromatic solvent, and water, and then a basic substance is added thereto, followed by neutralization. After cooling the resultant, the ether-based solvent, alcohol-based solvent, and aromatic solvent are removed, thus obtaining the self-emulsification type emulsion of the present invention.

Each step is explained below.

First, the modified polypropylene resin having an anionic functional group and the tackifier are dissolved by heating at a predetermined ratio in an ether-based solvent, alcohol-based solvent, an aromatic solvent, and water.

The ether-based solvent is not particularly limited. Examples of the ether-based solvent include tetrahydrofuran, propylene glycol monomethyl ether, propylene glycol monoethyl ether, propylene glycol monopropyl ether, and the like. These solvents can be used singly or in combination of two or more. Of these, tetrahydrofuran is preferable.

The alcohol-based solvent is not particularly limited. Examples of the alcohol-based solvent include C1-7 aliphatic alcohols, aromatic alcohols, alicyclic alcohols, and the like. These solvents can be used singly or in combination of two or more. Of these, C3-5 aliphatic alcohols are preferable, and isopropyl alcohol is more preferable.

The aromatic solvent is not particularly limited. Examples of the aromatic solvent include benzene, toluene, xylene, ethylbenzene, isopropylbenzene, solvent naphtha, and the like. These solvents can be used singly or in combination of two or more. Of these, toluene is preferable.

The proportion of the ether-based solvent, alcohol-based solvent, and aromatic solvent to be used is not particularly limited; however, the weight ratio thereof is preferably such that the ether-based solvent:alcohol-based solvent:aromatic solvent=100:3-50:3-50, and more preferably 100:5-35:5-35. When the proportion of the alcohol-based solvent per 100 parts by weight of the ether-based solvent exceeds 50 parts by weight, the solubility of the modified polyolefin resin having an anionic functional group at high temperature in the production step decreases, which may result in failure of uniform dispersion. When the proportion of the aromatic solvent exceeds 50 parts by weight, particles are aggregated to form many aggregates, which may result in failure of uniform dispersion. When the proportion of the alcohol-based solvent or aromatic solvent is less than 3 parts by weight, the effect of the solvent cannot be exhibited, which may result in failure of uniform dispersion.

In a mixed system before dissolving the modified polypropylene resin having an anionic functional group and the tackifier by heating, the proportion of the total amount of the modified polypropylene resin having an anionic functional group and the tackifier, water, and the total amount of organic solvents including the ether-based solvent, alcohol-based solvent, and aromatic solvent can be selected as desired. The weight ratio is preferably such that the total amount of the modified polypropylene resin having an anionic functional group and the tackifier:water:the total amount of organic solvents=100:50-800:11-900, and more preferably 100:200-400:43-233. A large amount of water or total organic solvents allows the modified polyolefin to be more readily dispersed in water, but is economically disadvantageous and impractical since it requires time for concentration and results in low volume efficiency. When the amount of water is small, the modified polyolefin may not be dispersed in many cases. When the total amount of the organic solvents is small, the viscosity may remarkably increase during dissolution by heating; thus, the modified polyolefin may not be dissolved uniformly. As a result, sometimes uniform dispersion cannot be performed.

The temperature for dissolving the modified polyolefin by heating is not particularly limited and is preferably 50° C. or more. The temperature for dissolving the modified polyolefin by heating is also preferably 75° C. or less since such a temperature is not higher than the boiling point of the organic solvents used, and does not require a pressure vessel for the dissolution by heating. Although the dissolution time is not particularly limited, the modified polyolefin can be generally dissolved completely in one to two hours.

Subsequently, a basic substance is added while maintaining the temperature. The basic substance is not particularly limited; however, examples thereof include morpholine; ammonia; amines such as methylamine, ethylamine, dimethylamine, triethylamine, ethanolamine, and dimethylethanolamine; and the like. These can be used singly or in combination of two or more. A preferable basic substance is dimethylethanolamine. The amount of the basic substance used is preferably 1 to 5 chemical equivalents, and more preferably 1.5 to 3.5 chemical equivalents relative to the carboxyl group of the modified polypropylene resin. The self-emulsification type emulsion of the present invention can maintain greater stability by keeping the pH between neutral and alkaline. The basic substance may be added as it is, or after dilution in water to achieve more uniform mixing. The temperature at which the basic substance is added and the dispersion time are not particularly limited; however, the temperature is preferably 50 to 75° C., like the dissolution temperature, and the time required for dispersion is preferably 1 to 2 hours.

Next, the organic solvent is removed from the resulting dispersion, thus obtaining a self-emulsification type emulsion. The organic solvent is distilled off under reduced pressure for removal. The degree of reduced pressure and temperature at the time of distilling off are not particularly limited; however, the degree of reduced pressure is preferably about 90 to 95 KPa (absolute pressure) and the temperature is preferably about 20 to 60° C. In this stage, part of water is also distilled off. The composition (weight ratio) of the self-emulsification type emulsion after distilling off the organic solvent and part of water by distillation under reduced pressure is preferably such that the ratio of modified polypropylene:basic substance:water=1:0.06 to 0.33:1.5 to 4. The organic solvent residual amount after distilling off under reduced pressure is preferably 1 part by weight or less, more preferably 0.1 parts by weight or less, and particularly preferably 0 parts by weight per 100 parts by weight of the modified polypropylene resin. If necessary, water can be additionally added.

A curing agent can be added to the self-emulsification type emulsion of the present invention as necessary. The curing agent is not particularly limited, and examples include water-soluble polyfunctional epoxy resins, water-soluble polyfunctional carbodiimide resins, aqueous dispersions of polyfunctional isocyanate compounds, water-soluble silane coupling agents having a polyfunctional silyl group. Of these, water-soluble polyfunctional epoxy resins are preferable. Examples of commercially available products include denacol (registered trademark) EX-512, denacol EX-521, denacol EX-614B, denacol EX-821, and denacol EX-920, produced by Nagase Chemtex Corporation. These water-soluble epoxy resins can be added in any proportion to the self-emulsification type emulsion of the present invention, and it is preferably added in an epoxy group amount equivalent to an acid value of the modified polypropylene resin in the emulsion.

Other than the above, various additives such as fillers, pigments, colorants, and antioxidants can be added in the range that does not impair the adhesion property of the self-emulsification type emulsion of the present invention.

Since the self-emulsification type emulsion obtained by the present invention has excellent adhesiveness to the polyolefin-based resin base material, it is useful as a primer for painting, printing, adhesion, and coating, coating composition, ink, coating agent, and adhesive.

The polyolefin-based resin base material can be suitably selected from known polyolefin resins. The polyolefin-based resin is not particularly limited, and polyethylene, polypropylene, ethylene-propylene copolymers, etc., can be used. Pigments and various additives can be added to the polyolefin-based resin base material, as necessary.

EXAMPLES

The present invention is detailed below with reference to Examples; however, the present invention is not limited to these Examples. In the Examples and Comparative Examples, "parts" simply indicates parts by weight. The measurement and evaluation methods used in the present invention are shown below.

1) Measurement of Solids Content of Emulsion

About 1 g of a sample emulsion was taken out in a 50-ml glass weighing bottle and precisely weighed. Subsequently, the weighing bottle containing the extracted sample was dried at 120° C. for 2 hours with a hot air dryer. The weighing bottle taken out was put into a desiccator and allowed to stand and cooled at room temperature for 30 minutes. The weighing bottle was taken out from the desiccator, and its weight was precisely weighed. The weight % of the solids content of the emulsion was calculated from weight change before and after hot air drying (using the following formula).

Solids content of emulsion (weight %)=[(sample weight before hot air drying)−(sample weight after hot air drying)]/(sample weight before hot air drying)×100

2) Quantification of Tackifier Content

The dry sample (resin) obtained in the measurement of solids content described above was dissolved in heavy chloroform, and the ratio of the modified polypropylene resin and the tackifier was obtained by $^1$H-NMR analysis using a GEMINI 400-MR nuclear magnetic resonance analyzer (NMR) produced by Varian, Inc.

3) Measurement of Emulsion Viscosity

A 0.6-g sample was measured using a Viscometer TV-22 (E type viscometer) produced by Toki Sangyo Co., Ltd., under the conditions of rotor No. 0.8° (=48')×R24, range H, 5 rpm, and 25° C.

4) Measurement of Emulsion pH

The value at 25° C. was measured using a pH meter F-52 produced by Horiba Ltd. The measuring device was calibrated by three-point measurements using a phthalate pH standard solution (pH: 4.01), a neutral phosphate pH standard solution (pH: 6.86), and a borate pH standard solution (pH: 9.18), all produced by Wako Pure Chemical Industries, Ltd.

5) Measurement of Z Mean Particle Diameter of Emulsion

A sample whose concentration was adjusted to 0.05 g/L was measured at 25° C. three times using a Zetasizer Nano-ZS Model ZEN 3600 produced by Malvern Instruments, Ltd., and the average was obtained.

6) Evaluation of Storage Stability of Emulsion

Emulsions prepared in the Examples and Comparative Examples were allowed to stand and stored in an incubator at 40° C., and the appearance changes of the emulsions were observed over time. The smaller the change in appearance over a long period of time (three months or more), the better. The results are shown in Table 1.

7) Evaluation of Adhesion to Olefin-Based Base Material

Dynol (registered trademark) 604 (produced by Air Products and Chemicals, Inc.) was added as a leveling agent in an amount of 0.5 wt % to each of the emulsions obtained in the Examples and Comparative Examples. The mixture was applied to a high-density polyethylene test piece having a thickness of 2 mm, and a size of 25 mm×100 mm, produced by Paltec Co., Ltd., using a #16E wire bar while leaving 1 cm from one end of the test piece as the chuck gripping region of a tensile tester. The test piece was then dried at 100° C. using a hot air dryer for 10 minutes. The untreated surface of an OPP film having a thickness of 60 µm and a size of 25 mm×200 mm was applied to the coated surface of the test piece immediately after taking it out from the drier in a manner such that the chuck gripping regions faced in the same direction. A load of 120 kg/m² was then applied, and aging was performed in an oven at 100° C. for 10 minutes, thus obtaining an adhesion sample. The adhesion sample taken out from the oven was allowed to stand overnight at room temperature and subjected to a peel-off test using a tensile tester (RTM-100 produced by Orientec Co., Ltd.) The tensile conditions were as follows. The end of the polyethylene test piece was gripped by a chuck of the tester and the end of the OPP film was gripped by the other chuck, and a 180° peel-off test was performed by pulling the test piece and the film up and down at a tensile speed of 50 mm/min using a 5-kgf load cell. The same test was performed four times, and the average of the measurement strength was regarded as the peel-off strength. At the same time, the peel-off surface was observed to confirm peel-off conditions.

Determination

A: 3.0 N/cm or more (Peel-off portions were observed at both the polyethylene interface and the OPP interface; strong adhesion strength was obtained.)

B: 2.0 N/cm or more to less than 3.0 N/cm (Peel-off occurred at the polyethylene interface; relatively strong adhesion was obtained.)

C: 1.0 N/cm or more to less than 2.0 N/cm (Peel-off occurred at the polyethylene interface; weak adhesion was obtained.)

D: Less than 1.0 N/cm (Peel-off occurred at the polyethylene interface; almost no adhesion was obtained.)

8) Evaluation of Water Resistance of Coating Film

Dynol (registered trademark) 604 (produced by Air Products and Chemicals, Inc.) was added as a leveling agent in an amount of 0.5 wt % to each of the emulsions obtained in the Examples and Comparative Examples. The coating liquid of the mixture was applied to an OPP film having a thickness of 25 µm using a #40E wire bar. The film was then dried at 120° C. using a hot air dryer for 30 minutes. The resulting coating film was cut into a strip shape having a size of 2.5 cm×30 cm, stored in a desiccator containing a silica gel for 24 hours, and dried. Strip coating films (samples for water resistance test) were thus obtained. Subsequently, each strip coating film was taken out and put into a sealing metal can to precisely weigh each coating film. The strip coating film was then taken out from the metal can and immersed in hot water at 40° C. for 5 minutes. The coating film was then taken out, and water on the surface was carefully wiped off with gauze. The coating film was again put into the sealing metal can and precisely weighed. The percentage of the coating film weight increase due to water absorption before and after hot water immersion was calculated and regarded as an index of water resistance. The evaluation criteria according to the coating film weight increase percentage are as follows.

A: Weight increase percentage after hot water immersion<2.5%

B: Weight increase percentage after hot water immersion=2.5 to 3.5%

C: Weight increase percentage after hot water immersion>3.5%

Example 1

188 g of deionized water, 50 g of acid modified polyolefin (a propylene-1-butene copolymer polymerized using a metallocene-based catalyst (propylene component: 76 mol % and 1-butene component: 24 mol %), graft amount of maleic anhydride: 2.4 wt %, weight average molecular weight: 60000, melt viscosity at 230° C.: 1950 mPa·s, melting point: 70° C.), which was used as a modified polypropylene resin having an anionic functional group, 7.5 g of a tackifier produced by Yasuhara Chemical Co., Ltd., (YS resin TO125; modified terpene resin, SP according to the Hoy calculation formula: 8.73 $(J/cm^3)^{1/2}$), 70 g of tetrahydrofuran, 5 g of isopropyl alcohol, and 5 g of toluene were put into a flask with a stirrer, and the mixture was heated to 70° C. Thereafter, the mixture was dissolved by heating at the same temperature for 2 hours. Subsequently, 3.3 g of dimethylethanolamine (amino group equivalent: 0.037 equivalent) was added to the mixture and gradually cooled to 40° C. over 2 hours. Thereafter, the organic solvent/water was distilled off under a reduced pressure degree of 91 KPa (absolute pressure) to obtain a pure-white, cloudy uniform emulsion (1). The obtained emulsion (1) had a solids content of 35.4 wt %, viscosity at 25° C. of 36.7 mPa/s, pH of 8.4, and mean particle diameter of 140 nm. It was also confirmed that the amount of the tackifier according to NMR was 15 phr (15 parts by weight of the tackifier relative to 100 parts by weight of the modified polypropylene resin) as in the composition ratio prepared. The emulsion (1) was stored in an incubator at 40° C. to evaluate storage stability. No change in appearance was observed when 3 months had passed. The results are summarized in Table 1. Using the emulsion (1), an adhesion sample (1) and a sample for water resistance test (1) were produced according to the above procedure to evaluate the adhesion to an olefin-based base material and water resistance. The results are summarized in Table 2.

Example 2

A pure-white, cloudy uniform emulsion (2) was obtained by the same method as in Example 1 except that the additional amount of the tackifier produced by Yasuhara Chemical Co., Ltd., (YS resin TO125; modified terpene resin) was changed to 15 g. It was confirmed that the obtained emulsion (2) had a solids content of 32.7 wt %, viscosity at 25° C. of 10.6 mPa·s, pH of 8.4, mean particle diameter of 175 nm, and a tackifier content of 30 phr (30 parts by weight of the tackifier relative to 100 parts by weight of the modified polypropylene resin) as in the composition ratio prepared. The emulsion (2) was stored in an incubator at 40° C. to evaluate storage stability. No change in appearance was observed when 3 months had passed. The results are summarized in Table 1. Using the emulsion (2), an adhesion sample (2) and a sample for water resistance test (2) were produced according to the above procedure to evaluate the adhesion to an olefin-based base material and water resistance. The results are summarized in Table 2.

Example 3

A pure-white, cloudy uniform emulsion (3) was obtained by the same method as in Example 1 except that the additional amount of the tackifier produced by Yasuhara Chemical Co., Ltd., (YS resin TO125; modified terpene resin) was changed to 20 g. It was confirmed that the obtained emulsion (3) had a solids content of 35.0 wt %, viscosity at 25° C. of 11.5 mPa·s, pH of 8.5, mean particle diameter of 174 nm, and a tackifier content of 40 phr (40 parts by weight of the tackifier relative to 100 parts by weight of the modified polypropylene resin) as in the composition ratio prepared. The emulsion was stored in an incubator at 40° C. to evaluate storage stability. No change in appearance was observed when 3 months had passed. The results are summarized in Table 1. Using the emulsion (3), an adhesion sample (3) and a sample for water resistance test (3) were produced according to the above procedure to evaluate the adhesion to an olefin-based base material and water resistance. The results are summarized in Table 2.

Example 4

A pure-white, cloudy uniform emulsion (4) was obtained by the same method as in Example 1 except that the additional amount of the tackifier produced by Yasuhara Chemical Co., Ltd., (YS resin TO125; modified terpene resin) was changed to 25.0 g. It was confirmed that the obtained emulsion (4) had a solids content of 38.1 wt %, viscosity at 25° C. of 19.7 mPa·s, pH of 8.4, mean particle diameter of 175 nm, and a tackifier content of 50 phr (50 parts by weight of the tackifier relative to 100 parts by weight of the modified polypropylene resin) as in the composition ratio prepared. The emulsion was stored in an incubator at 40° C. to evaluate storage stability. No change in appearance was observed when 3 months had passed. The results are summarized in Table 1. Using the emulsion (4), an adhesion sample (4) and a sample for water resistance test (4) were produced according to the above procedure to evaluate the adhesion to an olefin-based base material and water resistance. The results are summarized in Table 2.

Example 5

A pure-white, cloudy uniform emulsion (5) was obtained by the same method as in Example 1 except that as a tackifier produced by Yasuhara Chemical Co., Ltd., YS resin TO105 (modified terpene resin, SP according to the Hoy calculation formula: 8.73 $(J/cm^3)^{1/2}$) was added in an amount of 20 g. It was confirmed that the obtained emulsion (5) had a solids content of 34.2 wt %, viscosity at 25° C. of 10.4 mPa·s, pH of 8.5, mean particle diameter of 172 nm, and a tackifier content of 40 phr (40 parts by weight of the tackifier relative to 100 parts by weight of the modified polypropylene resin) as in the composition ratio prepared. The emulsion was stored in an incubator at 40° C. to evaluate storage stability. No change in appearance was observed when 3 months had passed. The results are summarized in Table 1. Using the emulsion (5), an adhesion sample (5) and a sample for water resistance test (5) were produced according to the above procedure to evaluate the adhesion to an olefin-based base material and water resistance. The results are summarized in Table 2.

Example 6

A slightly cloudy, yellow uniform emulsion (6) was obtained by the same method as in Example 1 except that as a tackifier produced by Yasuhara Chemical Co., Ltd., YS polyster T130 (terpene phenolic resin, SP according to the Hoy calculation formula: 8.81 $(J/cm^3)^{1/2}$) was added in an amount of 30 g. It was confirmed that the obtained emulsion (6) had a solids content of 34.7 wt %, viscosity at 25° C. of 16.2 mPa·s, pH of 8.7, mean particle diameter of 188 nm, and a tackifier content of 60 phr (60 parts by weight of the tackifier relative to 100 parts by weight of the modified polypropylene resin) as in the composition ratio prepared. The emulsion was stored in an incubator at 40° C. to evaluate storage stability. No change in appearance was observed when 3 months had passed. The results are summarized in Table 1. Using the emulsion (6), an adhesion sample (6) and a sample for water resistance test (6) were produced according to the above procedure to evaluate the adhesion to an olefin-based base material and water resistance. The results are summarized in Table 2.

Below, Comparative Example 1 is a case in which emulsion particles of a modified polypropylene resin having an anionic functional group did not surround a tackifier, and Comparative Example 2 is a case in which a modified polypropylene resin having an anionic functional group was formed into an emulsion using an emulsifier. As in Comparative Example 1, Comparative Example 2 also did not surround a tackifier. Comparative Example 3 is an example in which an attempt was made to form a modified polypropylene resin having an anionic functional group and a tackifier into an emulsion using an emulsifier; however, a stable uniform emulsion was not obtained. Comparative Example 4 is an example in which an attempt was made to form a tackifier alone into an emulsion using an emulsifier; however, a stable uniform emulsion was not obtained.

Comparative Example 1

A pure-white, cloudy uniform emulsion (7) was obtained by the same method as in Example 1 except that the tackifier produced by Yasuhara Chemical Co., Ltd., (YS resin TO125;

modified terpene resin) was not added. It was confirmed that the obtained emulsion (7) had a solids content of 30.7 wt %, viscosity at 25° C. of 24.0 mPa·s, pH of 8.7, and mean particle diameter of 110 nm. The emulsion was stored in an incubator at 40° C. to evaluate storage stability. No change in appearance was observed when 3 months had passed. The results are summarized in Table 1. Using the emulsion (7), an adhesion sample (7) and a sample for water resistance test (7) were produced according to the above procedure to evaluate the adhesion to an olefin-based base material and water resistance. The results are summarized in Table 2.

Comparative Example 2

50 g of acid-modified polyolefin (a propylene-1-butene copolymer polymerized using a metallocene-based catalyst (propylene component: 76 mol % and 1-butene component: 24 mol %), graft amount of maleic anhydride: 2.4 wt %, weight average molecular weight: 60000, melt viscosity at 230° C.: 1950 mPa·s, melting point: 70° C.), which was used as a modified polypropylene resin having an anionic functional group, and 150 g of tetrahydrofuran were put into a flask with a stirrer. The mixture was heated to 60° C. and dissolved by heating at the same temperature. After confirmation of the dissolution, 1.8 g of triethylamine was added, and then 5 g of Neopelex (registered trademark) G-65 produced by Kao Corporation (alkyl benzene sulfonic acid-based; solids content of 65%) dissolved in 5 g of tetrahydrofuran was added as an emulsifier, and the mixture was uniformly stirred. Subsequently, 300 g of deionized water was added dropwise for 1 hour, and stirring was performed at 60° C. for 30 minutes, followed by cooling to 40° C. The organic solvent/water was distilled off at a reduced pressure degree of 90 KPa (absolute pressure) to obtain a milky, cloudy uniform emulsion (8). The emulsion (8) had a solids content of 28.8 wt %, viscosity at 25° C. of 8.3 mPa/s, pH of 8.1, and mean particle diameter of 360 nm. The emulsion was stored in an incubator at 40° C. to evaluate the storage stability. A precipitated component was observed when 2 weeks had passed, and a solidified phase was phase-separated and precipitated when 3 months had passed. The results are summarized in Table 1. Using the emulsion (8), an adhesion sample (8) and a sample for water resistance test (8) were produced according to the above procedure to evaluate the adhesion to an olefin-based base material and water resistance. The results are summarized in Table 2.

Comparative Example 3

By the same method as in Comparative Example 2, in addition to a modified polypropylene resin having an anionic functional group, 7.5 g of a tackifier produced by Yasuhara Chemical Co., Ltd., (YS resin TO125; modified terpene resin) was added and dissolved by heating in 150 g of tetrahydrofuran. However, coarse particles were generated in a large amount while deionized water was added dropwise, and no uniform dispersion was obtained.

Comparative Example 4 (Dispersion of Tackifier by Emulsifier)

20 g of a tackifier produced by Yasuhara Chemical Co., Ltd. (YS resin TO125; modified terpene resin) was dissolved in 17 g of toluene under heating at 60° C. As an emulsifier, 3 g of Neopelex G-65 produced by Kao Corporation (alkyl benzene sulfonic acid-based; solids content of 65%) was added and dissolved in 3 g of tetrahydrofuran. 30 g of deionized water was added dropwise at the same temperature for 20 minutes, and stirring was performed at the same temperature for 30 minutes. The organic solvent/water was distilled off at a reduced pressure degree of 90 KPa (absolute pressure); however, no uniform dispersion was obtained.

The composition and properties of the emulsions prepared in the Examples and Comparative Examples are summarized in Table 1, and adhesion to the polyolefin-based resin base material, which was evaluated, is summarized in Table 2. As is clear from Tables 1 and 2, the present invention facilitates the preparation of an emulsion of a modified polypropylene containing a tackifier without using an emulsifier, and the addition of the tackifier remarkably improves adhesion, particularly to a polyethylene base material.

TABLE 1

| | | Composition (parts by weight) | | | | | Properties | | | | |
|---|---|---|---|---|---|---|---|---|---|---|---|
| Example/ Comparative Example | | Modified polypropylene resin having an anionic functional group | Tackifier | | | Emulsifier Neopelex G-65 | Solids content (wt %) | Viscosity (E type) (mPa · s) | pH (—) | Z mean particle diameter (nm) | Emulsion storage stability |
| | | | YS resin TO125 | YS resin TO105 | YS Polyester T130 | | | | | | |
| Example 1 | Emulsion (1) | 100 | 15 | | | | 35.4 | 36.7 | 8.4 | 140 | No change in appearance for three months |
| Example 2 | Emulsion (2) | 100 | 30 | | | | 32.7 | 10.6 | 8.4 | 175 | |
| Example 3 | Emulsion (3) | 100 | 40 | | | | 35.0 | 11.5 | 8.5 | 174 | |
| Example 4 | Emulsion (4) | 100 | 50 | | | | 38.1 | 19.7 | 8.4 | 175 | |
| Example 5 | Emulsion (5) | 100 | | 40 | | | 34.2 | 10.4 | 8.5 | 172 | |
| Example 6 | Emulsion (6) | 100 | | | 60 | | 34.7 | 16.2 | 8.7 | 188 | |
| Comparative Example 1 | Emulsion (7) | 100 | | | | | 30.7 | 24.0 | 8.7 | 110 | |
| Comparative | Emulsion | 100 | | | | 10 | 28.8 | 8.3 | 8.1 | 360 | A precipitated |

TABLE 1-continued

Composition Properties

| Example/Comparative Example | Modified polypropylene resin having an anionic functional group | Tackifier YS resin TO125 | Tackifier YS resin TO105 | Tackifier YS Polyster T130 | Emulsifier Neopelex G-65 | Solids content (wt %) | Viscosity (E type) (mPa · s) | pH (—) | Z mean particle diameter (nm) | Emulsion storage stability |
|---|---|---|---|---|---|---|---|---|---|---|
| Example 2 | (8) | | | | | | | | | component generated when 2 weeks had passed, and a solid/liquid separated when 3 months had passed. |
| Comparative Example 3 | Emulsion (9) | 100 | 15 | | 10 | No uniform dispersion was obtained. | | | | |
| Comparative Example 4 | Emulsion (10) | | 20 | | 3 | No uniform dispersion was obtained. | | | | |

TABLE 2

| Example/Comparative Example | Adhesion/water resistance test sample | Adhesion evaluation Peel-off strength (N/cm) | Evaluation | Peel-off condition | Water resistance evaluation |
|---|---|---|---|---|---|
| Example 1 | Adhesion/water resistance test sample (1) | 1.4 | C | Peel-off occurred at the polyethylene interface | A |
| Example 2 | Adhesion/water resistance test sample (2) | 2.9 | B | Peel-off occurred at the polyethylene interface | A |
| Example 3 | Adhesion/water resistance test sample (3) | 4.2 | A | Peel-off occurred at both polyethylene and OPP interfaces | A |
| Example 4 | Adhesion/water resistance test sample (4) | 4.5 | A | Peel-off occurred at both polyethylene and OPP interfaces | A |
| Example 5 | Adhesion/water resistance test sample (5) | 3.9 | A | Peel-off occurred at both polyethylene and OPP interfaces | A |
| Example 6 | Adhesion/water resistance test sample (6) | 4.1 | A | Peel-off occurred at both polyethylene and OPP interfaces | A |
| Comparative Example 1 | Adhesion/water resistance test sample (7) | 0.4 | D | Peel-off occurred at the polyethylene interface | A |
| Comparative Example 2 | Adhesion/water resistance test sample (8) | 0.2 | D | Peel-off occurred at the polyethylene interface | C |

INDUSTRIAL APPLICABILITY

Since the self-emulsification type emulsion of the present invention has excellent adhesiveness to a polyolefin-based resin base material, it is useful as a primer for painting, printing, adhesion, and coating, coating composition, ink, coating agent, and adhesive.

The invention claimed is:

1. A self-emulsification type emulsion comprising a tackifier and a modified polypropylene resin having an anionic functional group, wherein
   (1) the modified polypropylene resin having an anionic functional group is dispersed in water in the absence of an emulsifier,
   (2) the tackifier alone cannot be stably dispersed or dissolved in water as it phase-separates and precipitates in water,
   (3) a dispersion particle comprising the modified polypropylene resin having an anionic functional group includes the tackifier inside the dispersion particle,
   (4) the modified polypropylene resin dispersion particle has a Z mean particle diameter of 500 nm or less.

2. The self-emulsification type emulsion according to claim 1, wherein the tackifier is contained in the range of 5 parts by weight or more to 80 parts by weight or less per 100 parts by weight of the modified polypropylene resin.

3. An adhesive composition comprising the self-emulsification type emulsion according to claim 1.

4. An adhesive composition comprising the self-emulsification type emulsion according to claim 2.

5. The adhesive composition according to claim 3, which is an adhesive for a polyolefin-based resin.

6. The adhesive composition according to claim 4, which is an adhesive for a polyolefin-based resin.

7. A method for producing a self-emulsification type emulsion according to claim 1, said method comprising
    dissolving a tackifier and a modified polypropylene resin having an anionic functional group in a solvent and water by heating, adding a basic substance thereto, and then removing the solvent,
    wherein the method is performed in the absence of an emulsifier, and wherein the tackifier alone cannot be stably dispersed or dissolved in water as it phase-separates and precipitates in water.

* * * * *